(12) United States Patent
Schindler et al.

(10) Patent No.: US 9,197,424 B2
(45) Date of Patent: Nov. 24, 2015

(54) INLINE POWER DEVICE FOR MULTIPLE INLINE FORMATS

(75) Inventors: Frederick Roland Schindler, Sunnyvale, CA (US); Anoop Vetteth, Fremont, CA (US); Chris Desiniotis, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1061 days.

(21) Appl. No.: 13/175,122

(22) Filed: Jul. 1, 2011

(65) Prior Publication Data
US 2012/0212053 A1 Aug. 23, 2012

Related U.S. Application Data

(60) Provisional application No. 61/445,422, filed on Feb. 22, 2011.

(51) Int. Cl.
*H02J 3/14* (2006.01)
*H04L 12/10* (2006.01)

(52) U.S. Cl.
CPC ........ *H04L 12/10* (2013.01); *H04Q 2213/1308* (2013.01); *H04Q 2213/13389* (2013.01); *Y10T 307/406* (2015.04)

(58) Field of Classification Search
CPC ........... H04L 12/10; H04Q 2213/1308; H04Q 2213/13389; Y10T 307/406
USPC ........ 307/1, 31; 713/300; 709/224; 370/200; 3/1, 31
See application file for complete search history.

(56) References Cited

U.S. PATENT DOCUMENTS

| | | | |
|---|---|---|---|
| 7,500,118 B2 * | 3/2009 | Crawley et al. | 713/300 |
| 7,705,741 B2 * | 4/2010 | Picard | 340/652 |
| 7,921,307 B2 | 4/2011 | Karam et al. | |
| 7,921,314 B2 | 4/2011 | Schindler et al. | |
| 7,930,568 B2 | 4/2011 | Schindler | |
| 8,305,906 B2 * | 11/2012 | Karam | 370/241 |
| 8,779,786 B2 * | 7/2014 | Maniktala et al. | 324/713 |

* cited by examiner

*Primary Examiner* — Daniel Cavallari
(74) *Attorney, Agent, or Firm* — Edell, Shapiro & Finnan, LLC

(57) ABSTRACT

Techniques are provided for delivering power to powered devices. Power is received from an inline power device and the power is separated into multiple power distribution paths. The power is received at a connector jack comprising conductor pins configured to receive the power and data. A transceiver is configured to interface with the first portion and the second portion of the conductor pins of the connector jack. The power distribution paths are electrically isolated, and rectifying diodes are configured to interface with the conductor pins are also electrically isolated. The power is transmitted from the inline power device across the multiple power distribution paths.

20 Claims, 7 Drawing Sheets

INLINE POWER DEVICE FOR MULTIPLE INLINE FORMATS

CROSS REFERENCE TO RELATED APPLICATION

This application claims priority to U.S. Provisional Application No. 61/445,422, filed Feb. 22, 2011, the entirety of which is incorporated herein by reference.

TECHNICAL FIELD

The present disclosure relates to power distribution to network devices across multiple power distribution paths.

BACKGROUND

Powered devices (PDs) operating under the Institute of Electrical and Electronic Engineers (IEEE) inline power standards, e.g., the IEEE 802.3 standard, are attractive to customers for their electrical power saving capabilities. Often PDs will require more power than what is provided by power source devices. In such cases, PDs receive power from multiple IEEE 802.3 compliant power source equipment (PSE) devices.

DESCRIPTION OF EXAMPLE EMBODIMENTS

Overview

Techniques are provided for delivering power to powered devices. Power is received from an inline power device and the power is separated into multiple power distribution paths. The power is received at a connector jack comprising conductor pins configured to receive the power and data. A transceiver is configured to interface with the first portion and the second portion of the conductor pins of the connector jack. The power distribution paths are electrically isolated, and rectifying diodes are configured to interface with the conductor pins are also electrically isolated. The power is transmitted from the inline power device across the multiple power distribution paths.

Example Embodiments

Figure 1:
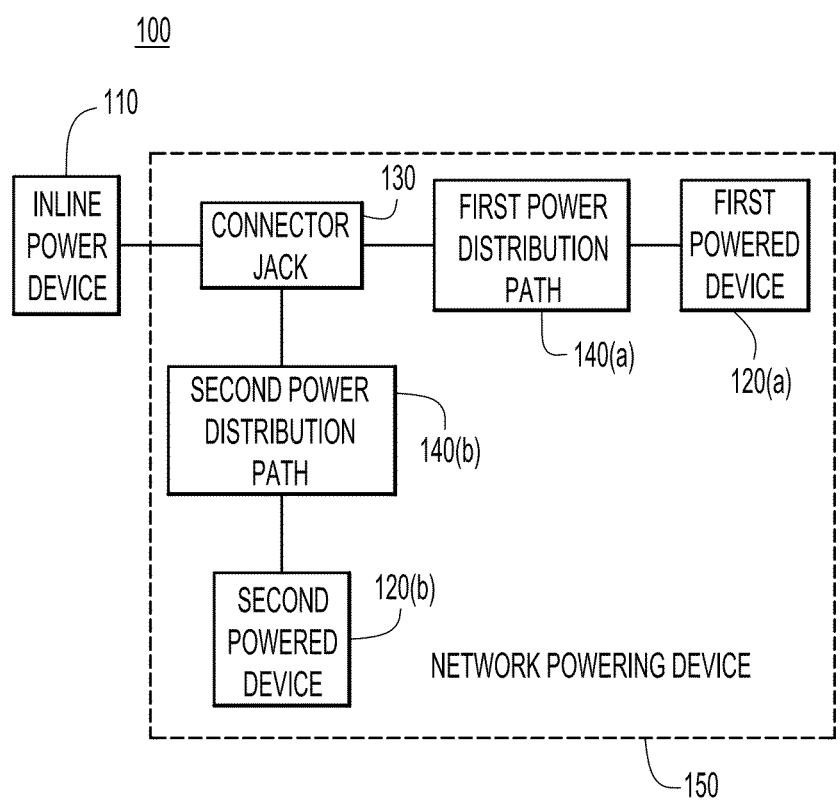
FIG. 1 shows an example system topology including an inline power device configured to supply power to multiple powered devices across multiple power distribution paths.

FIG. 1 shows an example system topology 100 of an inline power device 110 configured to deliver power to multiple powered devices, devices 120(a) and 120(b). The system 100 comprises a connector jack 130, which is coupled to each of the powered devices 120(a) and 120(b) via multiple power distribution paths, shown at reference numerals 140(a) and 140(b). The power distribution paths 140(a) and 140(b) are, for example, electrically isolated power distribution paths. It should be appreciated that the first powered device 120(a), the second powered device 120(b), the connector jack 130, the first power distribution path 140(a) and the second power distribution path 140(b) may reside within a single network powering device shown at reference numeral 150.

The inline power device 110 may be a Power over Ethernet (PoE) device or a power sourcing equipment device (e.g., an Ethernet switch) that, when added to a network device, allows the network device to provide power to the powered device 120(a)/120(b) through an Ethernet cable. It should be appreciated, however, that the inline power device 110 may be any power device configured to enable a network device to provide power to the powered devices 120(a) and 120(b). Similarly, the powered devices 120(a) and 120(b) may be PoE devices configured to receive power from the inline power device 110 over an Ethernet connection. The connector jack 130 may be any jack or port configured to interface with the inline power device 110 and may, for example, receive power from the inline power device 110 as well as data signals from network components (e.g., inline power device 110) coupled to the connector jack 130. For example, connector jack 130 may be a Registered Jack (RJ) 45, which is, for example, configured to receive an Ethernet cable from the inline power device 110. It should be appreciated that connector jack 130 may be any jack or port configured to receive power from a power device capable of powering the powered devices 120(a) and 120(b), and that the RJ45 jack is used as an example for simplicity. As described herein, the power distribution paths 140(a) and 140(b) may be any power distribution paths that are configured to transmit the power received at the connector jack 130 to the corresponding powered devices 120(a) and 120(b). For example, the first power distribution path 140(a) may be an "Alternative A" power distribution path described in the Institute for Electronics and Electrical Engineers (IEEE) standard 802.3, and the second power distribution path 140(b) may be an "Alternative B" power distribution path described in IEEE 802.3.

Figure 2:
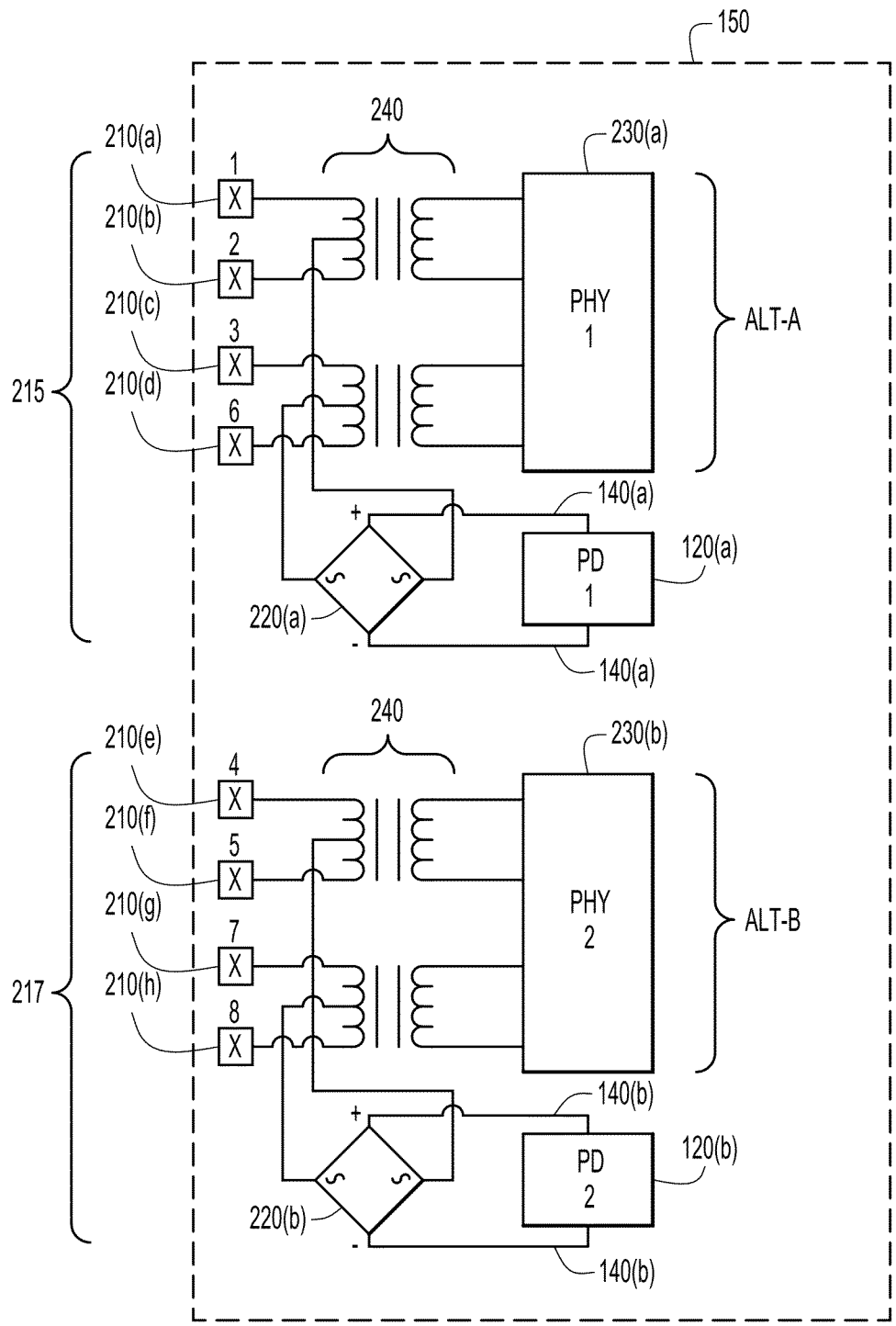
FIG. 2 shows an example schematic circuit diagram showing electrical components of the device shown in FIG. 1.

Reference is now made to FIG. 2. FIG. 2 shows an example schematic circuit diagram showing electrical components of the network powering device 150. The schematic circuit shows a plurality of conductor pins 210(a)-210(h) of the connector jack 130 (not shown in FIG. 2). The plurality of conductor pins 210(a)-210(h) of the connector jack 130 are configured to receive power and data, for example, from inline power device 110 or another network device. In one example, the connector jack 130 comprises eight conductor pins, wherein a first portion or subset 215 of the eight conductor pins provides power to the first powered device 120(a) via the first distribution path 140(a) and wherein a second portion or subset 217 of the eight conductor pins provides power to the second powered device 120(b) via the second power distribution path 140(b). For example, when the connector jack 130 is an RJ45 jack, the first portion 215 of conductor pins may comprise pins 1, 2, 3 and 6 of the RJ45 connector, and the second portion 217 may comprise pins 4, 5, 7, and 8 of the RJ45 connector, according to IEEE 802.3. FIG. 2 also shows rectifying diodes 220(*a*) and 220(*b*) coupled to the first portion 215 and second portion 217 of the conductor pins, respectively. In one example, rectifying diodes 220(*a*) and 220(*b*) are full-wave rectifying diodes connected to the conductor pins. When each of the first portion 215 and second portion 217 of conductor pins receives power from the inline power device 110, the rectifying diodes 220(*a*) and 220(*b*) receive the power, rectify the received power, and output the rectified power to the corresponding powered devices 120(*a*) and 120(*b*) associated with the first portion 215 and the second portion 217 of conductor pins. For example, as shown in FIG. 2, powered device 120(*a*) is associated with the first portion 215 of conductor pins, and power received at the first portion 215 of conductor pins is delivered to the rectifying diode 220(*a*), wherein the rectifying diode 220(*a*) rectifies the received power and outputs the rectified power to the powered device 120(*a*) across the power distribution path 140(*a*). Likewise, powered device 120(*b*) is associated with the second portion 217 of conductor pins, and power received at the second portion 217 of conductor pins is delivered to the rectifying diode 220(*b*), wherein the rectifying diode 220(*b*) rectifies the received power and outputs the rectified power to the powered device 120(*b*) across the power distribution path 140(*b*).

FIG. 2 also shows a transceiver device, shown at reference numeral 230(*a*)/230(*b*). PHY1 and PHY2 (labeled with reference numerals 230*a* and 230*b*, respectively, are components of a single transceiver device. The transceiver device 230(*a*)/230(*b*) is coupled to the first portion 215 and the second portion 217 of the conductor pins (via, e.g., inductors 240, described below) and is configured to transmit and receive data signals using the conductor pins 210(*a*)-210(*h*). In one example, when the transceiver device 230(*a*)/230(*b*) transmits and receives signals at a data rate of 10 megabits per second or at a data rate of 100 megabits per second, a first component (depicted by reference 230(*a*)) of the transceiver device 230(*a*)/230(*b*) transmits the data via the first portion 215 of conductor pins, and a second component (depicted by reference 230(*b*)) of the transceiver device 230(*a*)/230(*b*) receives the data via the second portion 217 of the conductor pins. In another example, at higher data rates, e.g., 1000 megabits per second, the transceiver 230(*a*)/230(*b*) transmits and receives data via both the first portion 215 of the conductor pins and the second portion 217 of the conductor pins. In other words, at relatively low data rates (e.g., ten and 100 megabits per second), data is received by the transceiver 230(*a*)/230(*b*) through the first portion 215 of the conductor pins and data is transmitted by the transceiver 230(*a*)/230(*b*) through the second portion 217 of the conductor pins. At relatively high data rates (e.g., 1000 megabits per second), data is both transmitted and received by the transceiver 230(*a*)/230(*b*) through the first portion 215 and the second portion 217 of conductor pins. It should be appreciated that the first component 230(*a*) and second component 230(*b*) are components of a single transceiver device 230(*a*)/230(*b*). FIG. 2 also shows a set of inductors 240 that enable the transceiver device 230(*a*)/230(*b*) to interface with the conductor pins 210(*a*)-210(*h*). In one example, the transceiver device 230(*a*)/230(*b*) may be a physical layer transceiver device ("PHY") that is configured to receive and transmit data signals via the conductor pins 210(*a*)-210(*h*).

In general, when an IEEE 802.3 compliant device, such as inline power device 110, is connected to connector jack 130, power that is ultimately destined for powered devices 120(*a*) and 120(*b*) is delivered to the first portion 215 and second portion 217 of conductor pins. For example, when the inline device 110 is a PoE device, pin pairs 1-2 and 3, 6 (shown in the first portion 215 in FIG. 2) operate as IEEE 802.3 "Alternative A" conductor pins to deliver data to the first powered device 120(*a*). Similarly, pin pairs 4-5 and 7-8 (shown in the second portion 217 in FIG. 2) operate as IEE 802.3 "Alternative B" conductor pins to deliver data to the second powered device 120(*b*). Depending on the type of inline power device 110 utilized to deliver power to the powered devices 120(*a*) and 120(*b*), power may be delivered on either "Alternative A" or "Alternative B" to respective powered devices 120(*a*) and 120(*b*) or may be delivered on both "Alternative A" and "Alternative B" paths to the respective powered devices 120 (*a*) and 120(*b*). For example, when the inline device 110 is a part of a network device that is configured to transmit and receive data to and from the powered devices 120(*a*) and 120(*b*) (at varying data rates, e.g., ten megabits per second, 100 megabits per second, and 1000 megabits per second), power may be delivered to the powered devices 120(*a*) and 120(*b*) on both the "Alternative A" power distribution path 140(*a*) and the "Alternative B" power distribution path 140 (*b*). The techniques described herein enable, for example, transitioning power delivery across "Alternative A" conductor pins and "Alternative B" conductor pins to utilize each of the four pairs of conductor pins to power the powered devices 120(*a*) and 120(*b*).

Figure 3A:
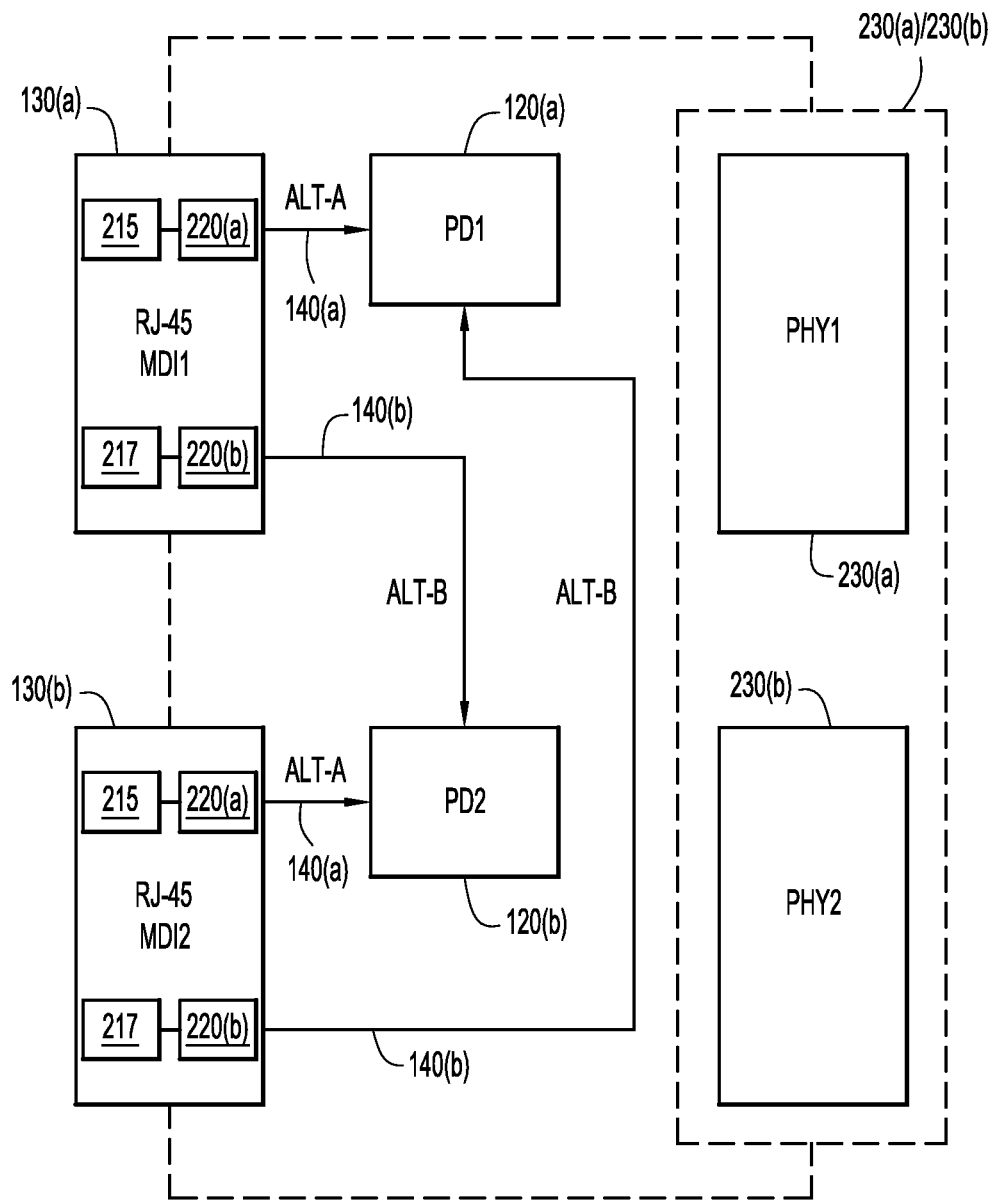
FIG. 3A shows an example configuration of the inline power device with multiple jacks, each of which is configured to deliver power to multiple powered devices along multiple power paths.

The inline power device 110 may reside within an endpoint network device or within a midspan network device. Additionally, the powered devices 120(*a*) and 120(*b*) may receive power from conductor pins 210(*a*)-210(*h*) of multiple connector devices 130. FIG. 3A shows an example configuration of the system 100 showing multiple connector jacks 130(*a*) and 130(*b*) for an inline power device, each of which is configured to deliver power to the powered devices 120(*a*) and 120(*b*). In general, each of the connector jacks 130(*a*) and 130(*b*) are coupled to an inline power device (not shown) to deliver power across the power distribution paths 140(*a*) and 140(*b*) to the powered devices 120(*a*) and 120(*b*), as described. For simplicity, FIG. 3A shows connector jacks 130(*a*) and 130(*b*) as RJ45 medium dependent interface (MDI) jacks, e.g., configured to receive an Ethernet cable from an inline power device (such as a PoE device). In FIG. 3A, a first connector jack 130(*a*) is coupled to the first powered device 120(*a*) ("PD1") via the power distribution path 140(*a*), which is, for example, is an "Alternative A" power distribution path, as described above. The first connector jack 130(*a*) is coupled to the second powered device 120(*b*) ("PD2") via the power distribution path 140(*b*), which is, for example, an "Alternative B" power distribution path. Likewise, a second connector jack 130(*b*) is coupled to the first powered device 120(*a*) via the "Alternative B" power distribution path 140(*b*), and the second connector jack 130(*b*) is coupled to the second powered device 120(*b*) via the "Alternative A" power distribution path. It should be appreciated that each of the "Alternative A" and "Alternative B" power distribution paths corresponds to the appropriate conductor pins for each connector jack 130(*a*) and 130(*b*), as described above, such that each connector jack 130(*a*) and 130(*b*) has an "Alternative A" and "Alternative B" power distribution path. In FIG. 3A, the transceiver device 230(*a*)/230(*b*) (comprising first component 230(*a*) and second component 230(*b*)) may be coupled to either the first connector jack 130(*a*) or the second connector jack 130(*b*) to transmit and receive data signals, as described above. Also, as stated above, it should be appreciated that the components depicted in FIG. 3A may reside within the network powering device 150.

Figure 3B:
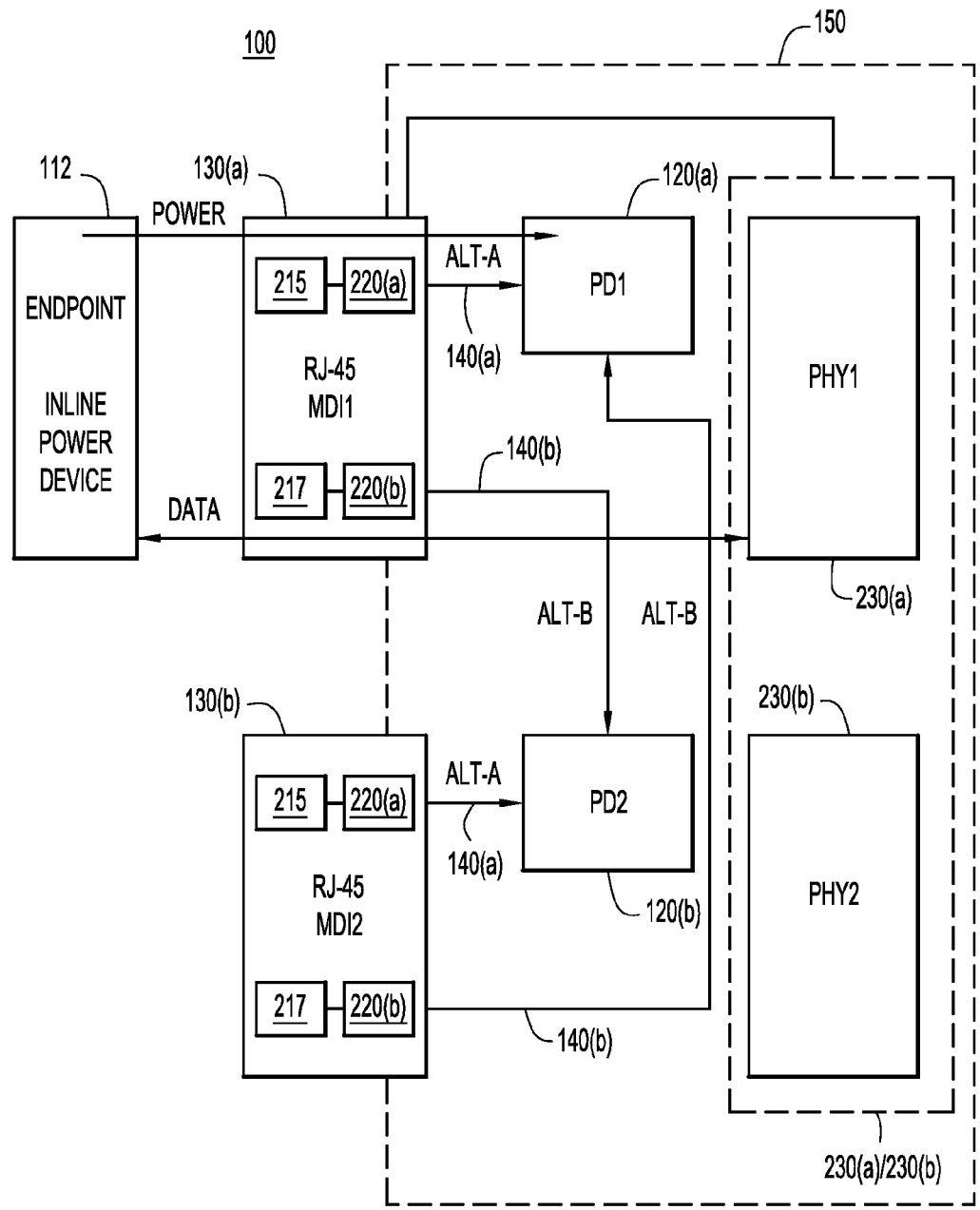
FIG. 3B shows an example system configuration with an endpoint inline power device configured to power a powered device along a power path and to transmit data to the powered device via a jack.
Figure 3C:
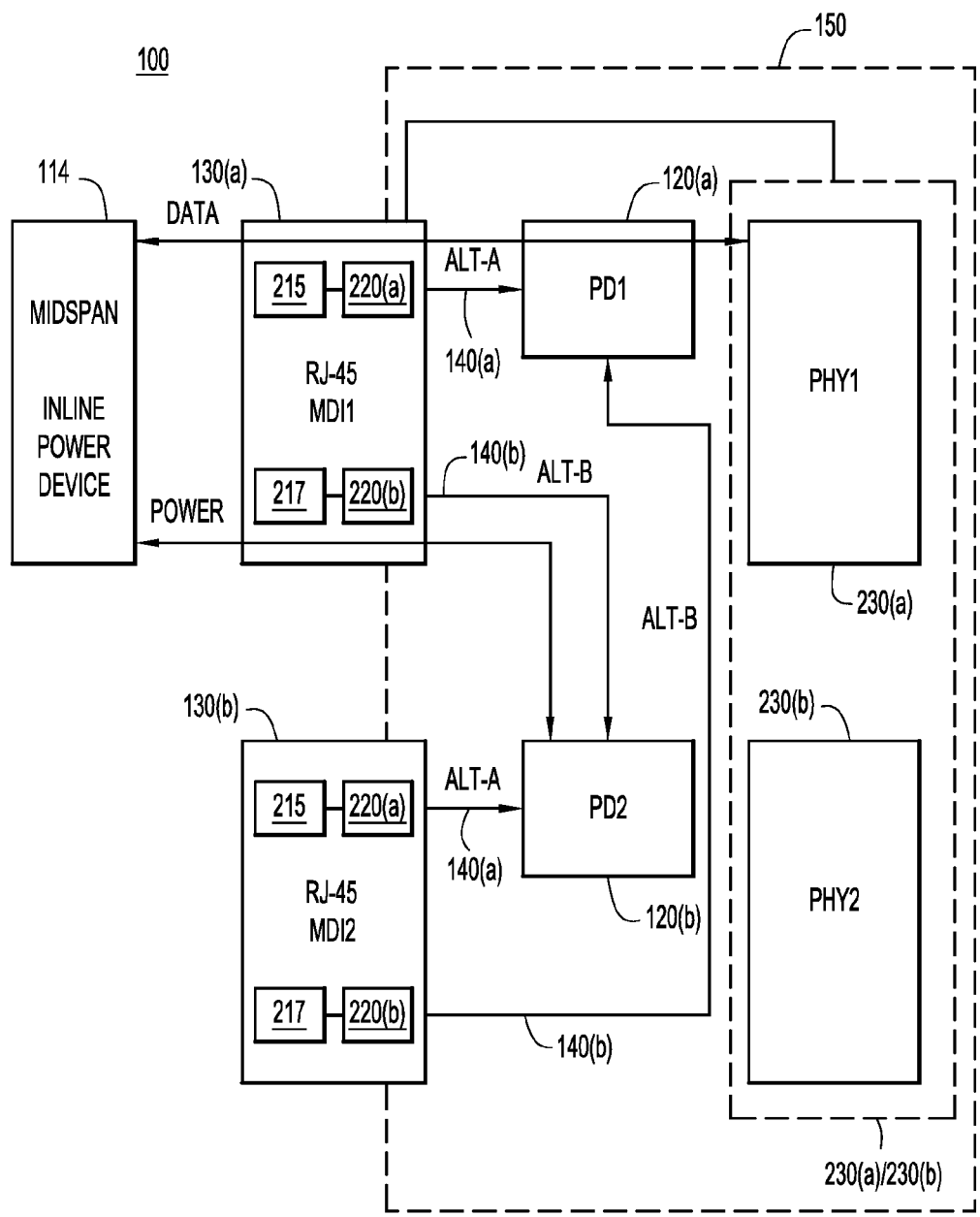
FIG. 3C shows an example system configuration with a midspan inline power device configured to power a first powered device along a power path and to transmit data to a second powered device via a jack.
Figure 3D:
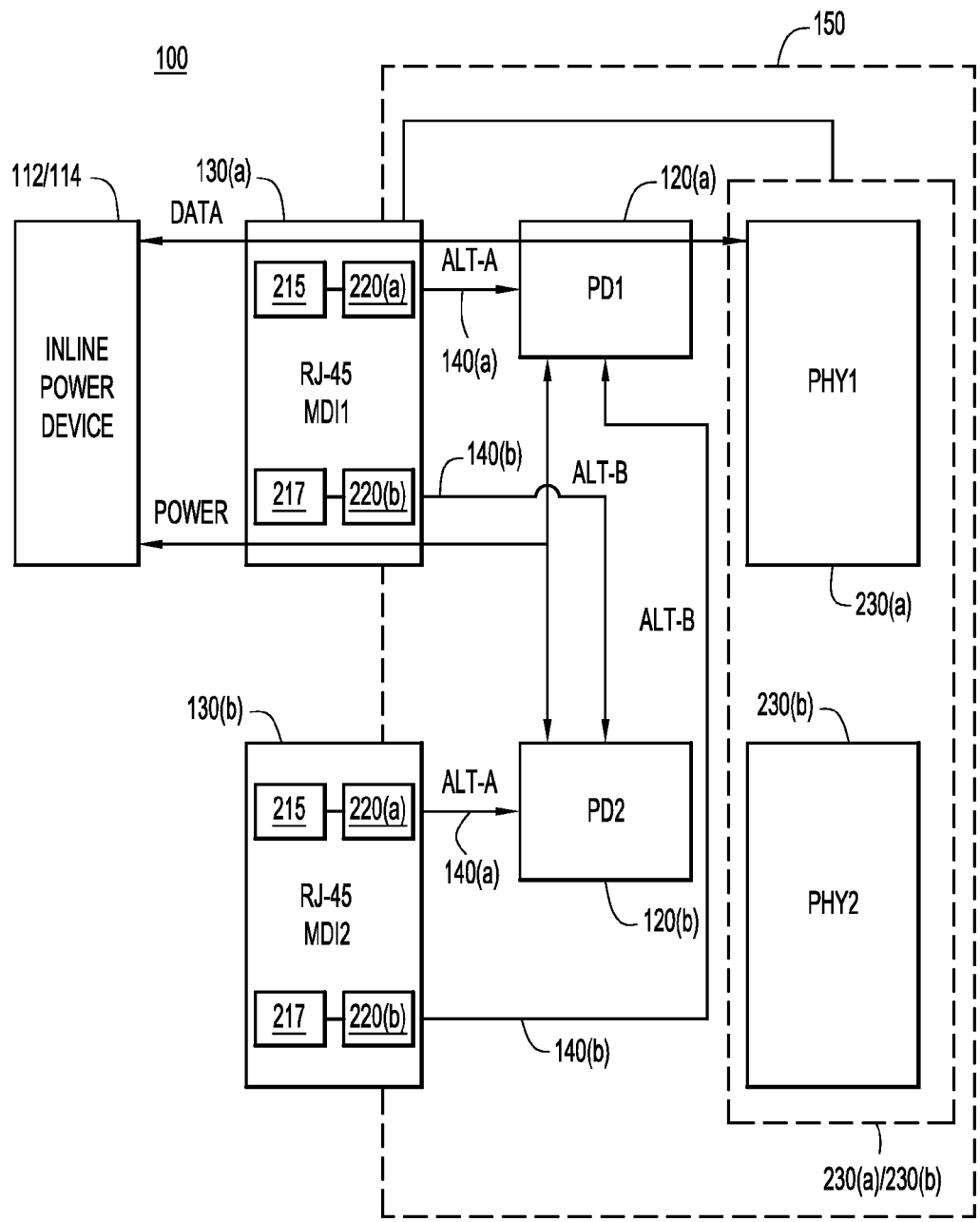
FIG. 3D shows an example system configuration with an inline power device configured to power a first and a second powered device along respective first and second power paths and to transmit data to the first powered device.

FIGS. 3B, 3C and 3D show alternate configurations for the system 100 for power and data being delivered to one or both of the powered devices 120(a) and 120(b). FIG. 3B shows an example in which the inline power device is an endpoint power device 112. In this configuration, the endpoint inline power device 112 may deliver power to the first powered device 120(a) via the "Alternative A" data path 140(a) associated with the first connector device 130(a) that is coupled to the endpoint inline power device 112. Also, the transceiver device 230(a)/230(b) in FIG. 3B is coupled to the first connector device 130(a), and accordingly, in this example, the transceiver device 230(a)/230(b) may transmit and receive data via the first connector device 130(a). In summary, FIG. 3B shows power being delivered to the first powered device 120(a) via "Alternative A" power distribution path 140(a) of the first connector device 130(a) and shows data being delivered to component 230(a) of the transceiver device 230(a)/230(b) via the first connector device 130(a).

FIG. 3C shows an example in which the inline power device as a midspan inline power device 114 that is configured to deliver power to the second powered device 120(b). In this example, the midspan inline power device 114 delivers power to the second powered device 120(b) via the "Alternative B" data path 140(b) associated with the first connector device 130(a). In this example, the transceiver 230(a)/230(b) is coupled to the first connector device 130(a), and thus, the transceiver is configured to transmit and receive data via the first connector device 130(a). In other words, FIG. 3C shows an embodiment where data is being delivered to the transceiver 230(a)/230(b), while power is being delivered to the second powered device 120(b).

FIG. 3D shows an example where the inline power device may be either an endpoint inline power device 112 or a midspan inline power device 114. For example, FIG. 3D shows the system 100 comprising four-pair power delivered by the endpoint inline power device 112 or the midspan power device 114. The system 100 in FIG. 3D may also comprise two-pair power delivered by the endpoint inline power device 112 or the midspan power device 114. In general, in FIG. 3D, the inline power device is configured to deliver power to both the first powered device 120(a) and the second powered device 120(b) via "Alternative A" and "Alternative B" data paths 140(a) and 140(b) of the first connector device 130(a). FIG. 3D also shows that the transceiver device 230(a)/230(b) is configured to transmit and receive data via the first connector device 130(a), while the power is being delivered to the first powered device 120(a) and the second powered device 120(b).

Figure 4:
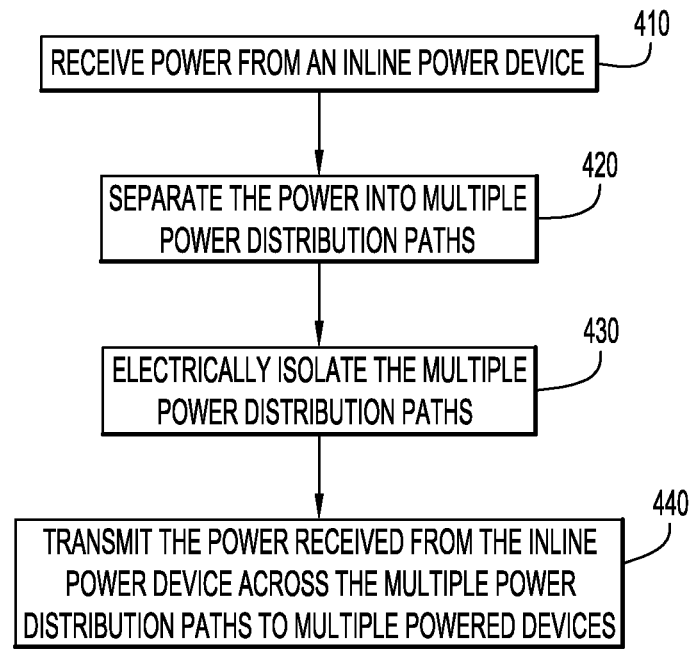
FIG. 4 shows a flow chart depicting examples of operations of components of the device of FIG. 1.

Turning to FIG. 4, an example flow chart is shown depicting examples of operations of components of the network powering device 150. At 410, the network powering device 150 receives power from the inline power device 110. At 420, the network powering device 150 separates the power into multiple power distribution paths, for example, the "Alternative A" and "Alternative B" data paths 140(a) and 140(b) described above. At 430, the data path 140(a) and 140(b) are electrically isolated, and at 440, the network powering device 150 transmits the received power from the inline power device across the multiple power distribution paths to, for example, multiple powered devices 120(a) and 120(b).

In summary, a method is provided, comprising: at a network powering device, receiving power from an inline power device; separating the power received from the inline power device into multiple power distribution paths; electrically isolating the multiple power distribution paths; and transmitting the power received from the inline power device across the multiple power distribution paths.

Additionally, an apparatus is provided, comprising: a connector jack comprising conductor pins configured to receive data and power from an inline power device; a first transceiver configured to interface with a first portion of the conductor pins of the connector jack; a first rectifying diode configured to interface with the first portion of the conductor pins; a second transceiver configured to interface with a second portion of the conductor pins of the connector jack, wherein the second transceiver is electrically isolated from the first portion of the conductor pins; and a second rectifying diode is configured to interface with the second portion of the conductor pins, wherein the second rectifying diode is electrically isolated from the first portion of the conductor pins.

The above description is intended by way of example only. Various modifications and structural changes may be made therein without departing from the scope of the concepts described herein and within the scope and range of equivalents of the claims.

What is claimed is:
1. A method comprising:
receiving power from an inline power device coupled to an apparatus, the apparatus comprising
a first connector jack comprising a first plurality of conductor pins coupled to the inline power device;
a first rectifying diode which interfaces with a first portion of the first plurality of conductor pins;
a second rectifying diode which interfaces with a second portion of the first plurality of conductor pins, wherein the second rectifying diode is electrically isolated from the first portion of the first plurality of conductor pins;
a second connector jack comprising a second plurality of conductor pins;
a third rectifying diode which interfaces with a first portion of the second plurality of conductor pins;
a fourth rectifying diode which interfaces with a second portion of the second plurality of conductor pins, wherein the fourth rectifying diode is electrically isolated from the first portion of the second plurality of conductor pins; and
a transceiver which interfaces with the first portion and the second portion of the first plurality of conductor pins of the first connector jack;
separating the power received from the inline power device into multiple power distribution paths coupled to the first rectifying diode and the second rectifying diode respectively;
electrically isolating the multiple power distribution paths; and
transmitting the power received from the first inline power device across the multiple power distribution paths to a first powered device, a second powered device, or to both the first powered device and the second powered device, wherein the transceiver is powered by the first powered device, the second powered device, or both the first powered device and second powered device when whichever powered device has power or both powered devices have power.
2. The method of claim 1, further comprising:
communicating data with the inline power device via a first portion of the transceiver, wherein transmitting the power comprises transmitting the power received from the inline power device across a first power distribution path of the multiple power distribution paths to the first powered device.

3. The method of claim 1, wherein receiving the power comprises receiving the power via the first plurality of conductor pins of the first connector jack.

4. The method of claim 3, wherein receiving comprises receiving the power at the first plurality of conductor pins of the first connector jack, wherein the first portion of the first plurality of conductor pins are coupled to a first power distribution path and the second portion of the first plurality of conductor pins are coupled to a second power distribution path for the received power.

5. The method of claim 4, wherein separating comprises:
separating the power received from the first inline power device into the first power distribution path corresponding to power received over the first portion of the first plurality of conductor pins and the second power distribution path corresponding to power received over the second portion of the first plurality of conductor pins,
wherein the first portion of the second plurality of conductor pins are coupled to a third power distribution path and the second portion of the second plurality of conductor pins are coupled to a fourth power distribution path.

6. The method of claim 5, wherein transmitting the power comprises transmitting the power from the inline power device across the first power distribution path to the first powered device when the inline power device is an endpoint inline power device.

7. The method of claim 5, wherein transmitting the power comprises transmitting the power from the inline power device across the second power distribution path to the second powered device when the inline power device is a midspan inline power device.

8. The method of claim 5, wherein transmitting the power comprises transmitting the power from the inline power device across the first power distribution path and the second power distribution path to both the first powered device and the second powered device, respectively.

9. The method of claim 8, wherein the third and fourth power distribution paths are coupled to the first powered device and second powered device, respectively.

10. The method of claim 5, wherein the first plurality of conductor pins of the first connector jack and second plurality of conductor pins of the second connector jack constitute respective medium dependent interface (MDI) ports in compliance with Institute of Electrical and Electronics Engineers (IEEE) standard 802.3.

11. The method of claim 10, wherein the first power distribution path and third power distribution path are Alternative A distribution paths in compliance with the IEEE standard 802.3 and the second power distribution path and fourth power distribution path are Alternative B distribution paths in compliance with the IEEE standard 802.3.

12. An apparatus comprising:
a first connector jack comprising a first plurality of conductor pins;
a first rectifying diode which interfaces with a first portion of the first plurality of conductor pins;
a second rectifying diode which interfaces with a second portion of the first plurality of conductor pins, wherein the second rectifying diode is electrically isolated from the first portion of the first plurality of conductor pins;
a second connector jack comprising a second plurality of conductor pins;
a third rectifying diode which interfaces with a first portion of the second plurality of conductor pins;
a fourth rectifying diode which interfaces with a second portion of the second plurality of conductor pins, wherein the fourth rectifying diode is electrically isolated from the first portion of the second plurality of conductor pins; and
a transceiver which interfaces with the first portion and the second portion of the first plurality of conductor pins of the first connector jack.

13. The apparatus of claim 12, wherein the first rectifying diode is coupled to a first powered device via a first power distribution path and the second rectifying diode is coupled to a second powered device via a second power distribution path.

14. The apparatus of claim 13, wherein the third rectifying diode is coupled to the second powered device via a third power distribution path and wherein the fourth rectifying diode is coupled to the first powered device via a fourth power distribution path.

15. The apparatus of claim 13, wherein the first rectifying diode outputs power across the first power distribution path to the first powered device when the first plurality of conductor pins of the first connector jack receive power from an endpoint inline power device.

16. The apparatus of claim 13, wherein the first rectifying diode outputs power across the first power distribution path to the first powered device when the first plurality of conductor pins of the first connector jack receive power from a midspan inline power device.

17. The apparatus of claim 13, wherein the first rectifying diode and the second rectifying diode output power across the first power distribution path and the second power distribution path to the first powered device and the second powered device, respectively, when the first plurality of conductor pins of the first connector jack receive power from an endpoint inline power device or a midspan inline power device.

18. The apparatus of claim 13, wherein the first plurality of conductor pins of the first connector jack and the second plurality of conductor pins of the second connector jack constitute respective medium dependent interface (MDI) ports in compliance with Institute of Electrical and Electronics Engineers (IEEE) standard 802.3.

19. The apparatus of claim 14, wherein the first power distribution path is an Alternative A distribution path in compliance with the IEEE standard 802.3 and wherein the second power distribution path is an Alternative B distribution path in compliance with the IEEE standard 802.3.

20. The apparatus of claim 18, wherein the first plurality of conductor pins of the first connector jack and second plurality of conductor pins of the second connector jack both support an Ethernet connection.

* * * * *

UNITED STATES PATENT AND TRADEMARK OFFICE
CERTIFICATE OF CORRECTION

PATENT NO. : 9,197,424 B2  Page 1 of 1
APPLICATION NO. : 13/175122
DATED : November 24, 2015
INVENTOR(S) : Frederick Roland Schindler et al.

It is certified that error appears in the above-identified patent and that said Letters Patent is hereby corrected as shown below:

In the claims

At col. 6, line 52, delete the word "first".

At col. 7, line 12, delete the word "first".

Signed and Sealed this
Nineteenth Day of April, 2016

Michelle K. Lee
*Director of the United States Patent and Trademark Office*